United States Patent [19]

Acheson et al.

[11] Patent Number: 4,472,935
[45] Date of Patent: * Sep. 25, 1984

[54] METHOD AND APPARATUS FOR THE RECOVERY OF POWER FROM LHV GAS

[75] Inventors: Willard P. Acheson, Pittsburgh, Pa.; Richard A. Morris, Missouri City, Tex.; Raymond J. Rennard, Pittsburgh; Thiagarajan Viswanathan, Allison Park, both of Pa.

[73] Assignee: Gulf Research & Development Company, Pittsburgh, Pa.

[*] Notice: The portion of the term of this patent subsequent to May 13, 1997 has been disclaimed.

[21] Appl. No.: 104,128

[22] Filed: Dec. 17, 1979

Related U.S. Application Data

[63] Continuation-in-part of Ser. No. 930,557, Aug. 3, 1978, Pat. No. 4,202,169, and Ser. No. 925,703, Jul. 18, 1978, Pat. No. 4,202,168, each is a continuation-in-part of Ser. No. 791,850, Apr. 28, 1977, abandoned.

[51] Int. Cl.$^3$ ............................. F02C 3/22; F02C 7/22
[52] U.S. Cl. ...................................... 60/39.06; 60/723
[58] Field of Search ................. 60/39.02, 39.06, 39.12, 60/39.46 G, 723, 39.82 C; 431/7

[56] References Cited

U.S. PATENT DOCUMENTS

| | | | |
|---|---|---|---|
| 2,624,172 | 1/1953 | Houdry | 60/39.46 R |
| 3,928,961 | 12/1978 | Pfefferle | 60/39.06 |
| 4,202,168 | 5/1980 | Acheson et al. | 60/39.12 |
| 4,202,169 | 5/1980 | Acheson et al. | 60/39.12 |

Primary Examiner—Louis J. Casaregola
Attorney, Agent, or Firm—Deane E. Keith; Forrest D. Stine

[57] ABSTRACT

A method and apparatus are disclosed for the utilization of energy in gas of low heating value. The low heating value gas is preheated, mixed with an amount of air that will provide oxygen in an amount that will limit the maximum temperature rise in a catalytic combustion chamber to avoid excessive temperatures, and delivered into the catalytic combustion chamber at a temperature exceeding about 400° F. that will cause ignition of the combustibles on contact with the catalyst. In a preferred embodiment, combustion is accomplished in two combustion chambers connected in series with a heat exchanger between the combustion chambers for cooling the combustion products discharged from the first combustion chamber before they are delivered to the next combustion chamber. Approximately fifty percent of the total combustion air is mixed with the combustible gas before delivery into each of the combustion chambers. Effluent from the second combustion chamber is used to drive a gas turbine for generation of power or direct driving of air compressors.

13 Claims, 3 Drawing Figures

METHOD AND APPARATUS FOR THE RECOVERY OF POWER FROM LHV GAS

This application is a continuation-in-part of our U.S. application Ser. No. 925,703, filed July 18, 1978, (U.S. Pat. No. 4,202,168), entitled Method for the Recovery of Power from LHV Gas, and U.S. application Ser. No. 930,557, filed Aug. 3, 1978, (U.S. Pat. No. 4,202,169), entitled System for Combustion of Gases of Low Heating Value, each of which is a continuation-in-part of U.S. application Ser. No. 791,850, filed Apr. 28, 1977, (Abandoned), entitled Power Recovery Process.

BACKGROUND OF THE INVENTION

1. Field of the Invention

This invention relates to the recovery of the energy in gases of low heating value. It is particularly useful for the recovery of the energy in gases produced in an in-situ combustion process for the production of oil from underground carbonaceous deposits and more particularly from underground deposits of oil and oil shale.

2. Description of the Prior Art

One method for increasing the production of heavy crude oils of high viscosity from underground formations is the in-situ combustion process. In that process, air is injected at a high pressure through an injection well into the underground formation containing the heavy oil. The oil in the formation adjacent the injection well is ignited by any of several known procedures such as the procedure disclosed in U.S. Pat. No. 3,172,472 of F. M. Smith. Injection of air is continued after ignition to burn part of the oil in the formation and to increase the pressure in the formation adjacent the injection well and thereby drive oil in the formation toward a production well spaced from the injection well. A typical in-situ combustion process is described in U.S. Pat. No. 2,771,951 of Simm. The heat released by combustion of some of the oil in the formation heats the formation and oil whereby the viscosity of the oil is greatly reduced by the high temperature, cracking of the oil, and by solution in the oil of low molecular weight hydrocarbons formed by the cracking. The reduced viscosity and the pressure of the injected gases cause the oil to flow through the underground reservoir to a production well.

During in-situ combustion processes, the combustion front at which oil in the formation is burned does not move radially outward at a uniform rate in all directions. Usually the oil reservoir will vary in permeability and oil saturation from one location to another between the injection and production wells. Some of the injected air fingers through the formation toward a production well and combustion occurs at the boundaries of the fingers. There may be a breakthrough of combustion products in the nature of a flue gas long before the production of oil by the in-situ process is completed. Volatile constituents in the oil, or formed by cracking of the oil, are entrained in the injected air or flue gases and carried by them to the production well. All of these factors contribute toward variations in the composition of the gas produced from time to time during an in-situ combustion for the production of oil from a reservoir. Such variations may result in periodic increases of 100 percent or more in the heating value of the gas produced.

The fluids produced at the production well are separated into liquid petroleum products which are delivered to storage or a delivery line and gaseous products. The gaseous products customarily have been vented to the atmosphere. The gaseous products, hereinafter referred to as LHV gas, from in-situ combustion contain low concentrations of methane and $C_2$-$C_6$ hydrocarbons, as well as nitrogen, carbon dioxide, sulfur compounds such as hydrogen sulfide, mercaptans and carbonyl sulfide, and in some instances a small amount of carbon monoxide and traces of oxygen. Those gaseous products constitute low heating value fuel capable of supplying a substantial part of the energy required to compress the air for injection into the subsurface formation at the injection well. The shortage of natural gas makes it important that the energy in the products from an in-situ combustion process be fully utilized. Moreover, tightening of laws relating to pollution of the atmosphere has placed stringent limitations on the amount of carbon monoxide, the sulfur compounds most frequently present in the gaseous products, and hydrocarbons other than methane that may be discharged into the atmosphere.

U.S. Pat. No. 3,113,620 of Hemminger describes a single well in-situ combustion process in which a cavity filled with rubble is formed in a subsurface oil shale deposit by means of a nuclear explosion. An in-situ combustion process in the cavity is then conducted to remove oil from the rock, aid in draining the oil into a pool in the bottom of the cavity, and force the oil up the well to the surface. The composition of the gases produced with the oil differs from the composition of gas produced in a conventional in-situ combustion process in an oil reservoir. Because of the different composition of the gas, Hemminger is able to burn the off-gas directly in a flame combustor of a gas turbine used to drive an air compressor.

Jr. U.S. Pat. No. 2,449,096 of Wheeler, Jr. describes a process for the recovery of power from gas discharged from a regenerator in a fluidized catalytic cracking process. The hot gases from the regenerator are first passed countercurrently to a nonvolatile oil in a scrubber whereby only a small amount of hydrocarbons is left in the gas. The gas with entrained hydrocarbons is passed through a catalytic oxidizer for burning the hydrocarbons and the combustion products are delivered either to a turbine for direct power recovery or to a steam generator.

U.S. Pat. No. 2,859,954 of Grey describes a power recovery system for a blast furnace in which blast furnace gas is compressed, burned, and then expanded in a turbine to provide energy for compressing air used in the blast furnace. The combustible material in the blast furnace gas is largely carbon monoxide and hydrogen. Those gases are more readily ignited and burned in dilute mixtures with inert gases than is methane. The blast furnace gas, which typically has a heating value above 90 btu/scf, is burned by Grey in flame-type combustors for release of the thermal energy.

U.S. Pat. No. 3,928,961 of Pfefferle describes the catalytic combustion of fuels to drive gas turbines. The method of Pfefferle conducts catalytic oxidations at a temperature in the range of 1700° F. to 3200° F., preferably in the range of 2000° F. to 3000° F., described by Pfefferle as the autoignition range. That temperature is high enough to initiate thermal combustion, but not high enough to cause substantial formation of nitrogen oxides. Combustion in the Pfefferle method is primarily thermal combustion. Air at least stoichiometrically equivalent to the fuel is used to complete the oxidation. When the combustion is used for gas turbine operations, the weight ratio of air to fuel is far above the stoichiometric ratio and ranges from about 30:1 to 200 or more to 1. Because the composition of the fuel is constant, the excess of oxygen in the air-fuel mixture does not cause wide variations in the temperature of the combustion products.

Because oil shale is impermeable, in-situ combustion processes for the recovery of oil from oil shale require that permeability of the shale be established before the in-situ combustion is begun. It is preferred that the permeability be established by rubblizing shale in a selected portion of the shale deposit to form an underground retort. Combustion of shale in the retort to release shale oil is preferably accomplished at low pressures to avoid leakage of gas to adjacent retorts that are being rubblized. Gases discharged from retorts for in-situ combustion processes for shale oil production are usually, therefore, at pressures too low for delivery directly into gas turbines for power recovery. Typical in-situ combustion processes for the recovery of oil from oil shale are described in U.S. Pat. No. 2,780,449 of Fisher et al. and U.S. Pat. No. 3,001,776 of Van Poollen.

SUMMARY OF THE INVENTION

This invention resides in a method and apparatus for the recovery of energy from LHV gas, preferably LHV gas discharged from production wells of in-situ combustion processes for the production of oil. The LHV gas is preheated to a temperature exceeding approximately 400° F., mixed with a limited quantity of air, and the mixture delivered into a catalytic combustion chamber in which combustibles in the LHV gas are burned. The amount of air mixed with the LHV gas is less than the stoichiometric equivalent of the combustibles in the LHV gas and thereby limits the amount of combustion and the maximum temperature that may occur in the combustion chamber. In a preferred embodiment, the LHV gas is burned in a primary and a secondary catalytic combustion chamber with approximately fifty percent of the total air introduced into each combustion chamber. Hot gases discharged from the primary catalytic combustion chamber are cooled to a temperature such that on mixture with the air for the secondary combustion step the resulting secondary combustion mixture will have a temperature suitable for introduction into the secondary catalytic combustion chamber. The secondary combustion mixture is delivered into the secondary catalytic combustion chamber for combustion of combustible material remaining in the gas. The combustion products discharged from the second combustion chamber are expanded in a turbine to generate power.

DESCRIPTION OF PREFERRED EMBODIMENT

Figure 1:
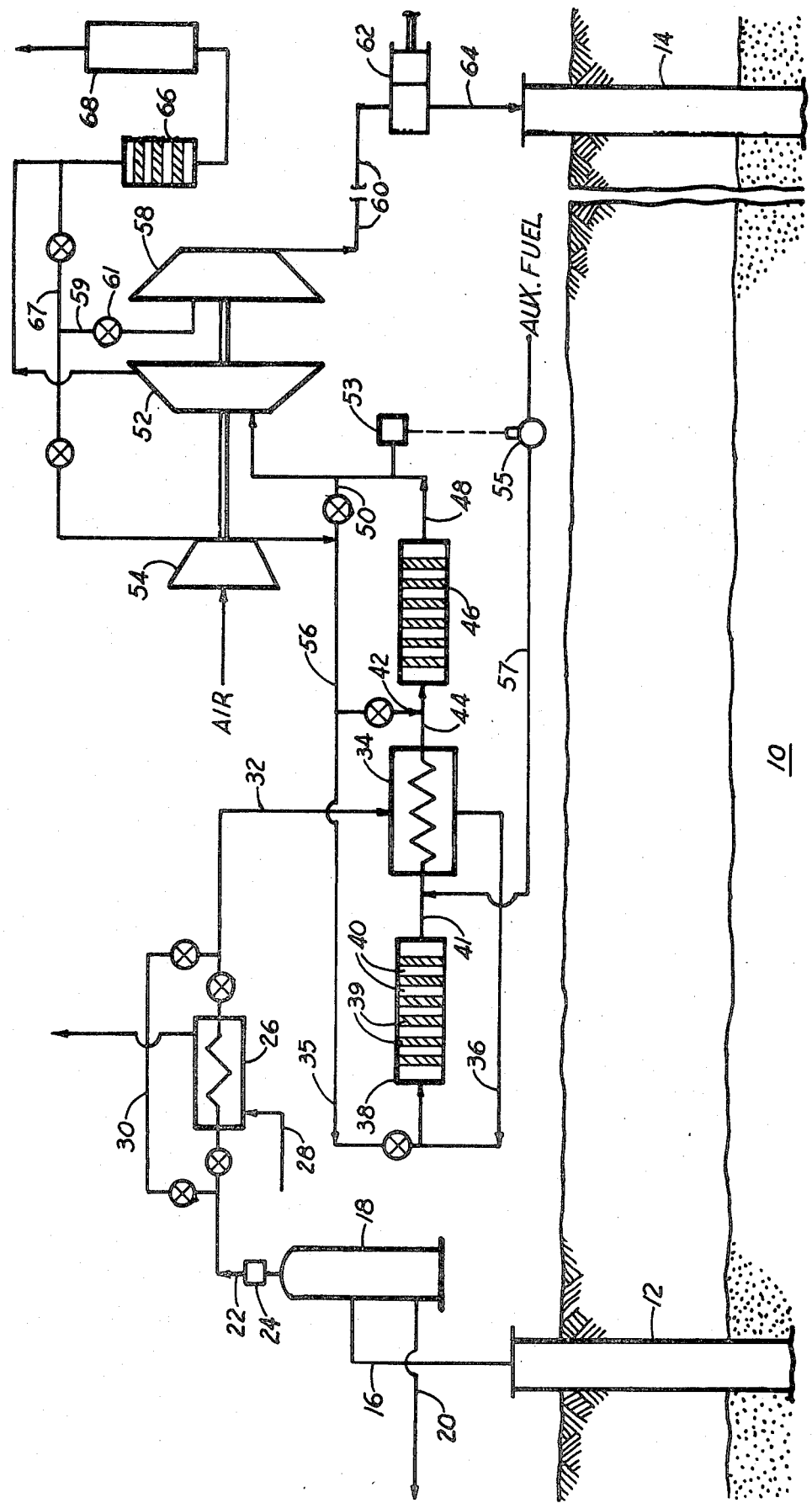
FIG. 1 of the drawings is a diagrammatic flow sheet of a preferred embodiment of this invention as used for the recovery of power from LHV gas discharged from an in-situ combustion system for the recovery of oil from an underground oil reservoir.

Referring to FIG. 1 of the drawings, a subsurface formation 10 containing crude oil, usually of high density and viscosity, is penetrated by a production well 12 and an injection well 14 spaced from the production well. Fluids produced from the production well 12 are delivered through a line 16 into a separator 18 in which the produced LHV gas is separated from liquids produced through well 12. The liquids are discharged from the lower end of the separator 18 into a delivery line 20 and the LHV gas is discharged from the top of separator 18 into a feed line 22. It will usually be desirable to pass the gas from the separator 18 through a suitable gas clean-up, not shown, to remove solid particulates, catalyt poisons, or other undesirable constituents before delivery into line 22. A flow controller 23 maintains a constant flow rate of the LHV gas to the turbine as hereinafter described.

Typical hydrocarbon concentrations in the LHV gas range from about 1 to 8 percent by volume. The hydrocarbons are principally methane; the concentration of $C_2$-$C_6$ hydrocarbons usually being less than 2 percent. In the concentrations present in the LHV gas, stable combustion of methane and the other low molecular weight hydrocarbons produced in in-situ production is obtained only in the presence of a catalyst. The heating value of the LHV gas produced from in-situ combustion in oil reservoirs may range from 5 to 80 BTU/scf, and ordinarily will be in the range of 40 to 70 BTU/scf, a range in which the process is particularly useful. On some occasions, usually for short periods, the heating value may rise to 100 BTU/scf. LHV gas having a heating value above 15 BTU/scf can be burned in a catalytic combustor without an external source of heat. If other sources of heat are available to provide additional preheat, LHV gas having a heating value as low as 5 BTU/scf can be oxidized in catalytic combustion chambers.

For most effective use in driving a gas turbine to compress air used in the in-situ combustion process, for example, the gases discharged from the separator 18 should be at a pressure of at least 75 psig. If the gas is at lower pressure, part of the energy is used in compressing the LHV gas to a pressure high enough to drive a turbine, however, LHV gas at lower pressures may contain substantial energy which can be useful in supplying heat for heater-treaters and other oil field equipment or for developing power by supplying heat to generate steam at a pressure high enough to drive a turbine. The pressure in the production wells of an in-situ combustion process usually range from slightly above atmospheric pressure to 800 psig. The pressure is dependent, at least in part on the depth of the formation in which the combustion occurs. Pressures higher than 800 psig in the production wells can be used but such high pressures suffer the disadvantage of high costs for compressing the air injected into the underground formation; however, much of the energy used in compressing the air can be recovered.

During startup the gas in line 22 is passed through a heater 26. A fuel, such as LPG, supplied through line 28 is burned in heater 26 to raise the temperature of the LHV gas to a temperature such that after mixing with primary combustion air oxidation will occur on contact with the oxidation catalyst hereinafter described. The heater 26 is used only during startup, and after oxidation of the LHV gas commences, heater 26 is bypassed by flowing the LHV from line 22 through bypass 30.

The LHV gas discharged from heater 26 is delivered through line 32 into a heat exchanger 34. No heat transfer to the LHV gas occurs in heat exchanger 34 until after combustion has begun in the catalytic combustion chamber as hereinafter described. After passing through heat exchanger 34, the LHV gas is mixed with compressed air delivered through line 35 and the mixture delivered through line 36 into a primary catalytic combustion chamber 38. The temperature of the gas delivered to the combustion chamber 38 should be in the range of approximately 400° to 800° F. whereby oxidation will be initiated on contact of the LHV gas with the catalyst. Usually, the inlet temperature will be in the upper part of that temperature range. Adiabatic compression of air to a pressure of 75 psig will raise the temperature to approximately 400° F.; consequently, it may be necessary to heat the LHV gas to slightly higher than 800° F. in the heat exchanger 34 to obtain the desired temperature of the gas mixture.

In a preferred catalytic oxidation chamber, platinum is deposited on the surfaces of a commercially available ceramic honeycomb-type catalyst support arranged in primary combustion chamber 38 in a series of transverse slabs 39 separated from one another by free spaces 40. The free spaces between the slabs are designed to allow equalization of the temperature of the gases between the slabs and thereby minimize development of hot spots; however, satisfactory operation has been obtained with adjacent slabs touching. The honeycomb-type of catalyst support is advantageous in allowing high throughputs with a low pressure drop through the catalyst. In a typical combustion chamber there may be 10 to 20 or even more slabs 39. A catalyst that can be used is described in U.S. Pat. No. 3,870,455 of Hindin. The arrangement and catalyst shown are preferred for use in this invention; however, this invention is not restricted to the use of a particular catalyst. Other oxidation catalysts supported on other supports can be used. For example, catalysts containing cobalt or lanthanum as the catalytically active ingredients supported on honeycomb or on sponge-type supports can be used. Other catalysts that can be used are described in U.S. Pat. No. 3,565,830 of Keith et al. Oxidation catalysts used at temperatures higher than 2000° F. are described in U.S. Pat. No. 3,928,961 of Pfefferle.

The gases are discharged from combustion chamber 38 at a maximum temperature preferably of approximately 1600° F. through line 41. The maximum temperature is limited by the highest temperature that the catalyst can withstand over long operating periods without deterioration and is controlled by the amount of air mixed with the LHV gas delivered to combustion chamber 38. Preferred oxidation catalysts for this invention in which combustion products are passed through a gas turbine that consist of platinum on a ceramic support can withstand higher temperatures than 1600° F. for short periods but their life is shortened by continued use at the higher temperatures. The LHV gas is delivered through line 41 into heat exchanger 34 and passed therein in indirect heat exchange with the initial mixture of air and LHV gas delivered to the heat exchanger through line 32. The partially oxidized LHV gas is discharged from heat exchanger 34 at a temperature preferably of approximately 800° F. and delivered after mixture with secondary combustion air supplied through line 42 via line 44 into a secondary catalytic combustion chamber 46. Secondary catalytic combustion chamber 46 may be identical to primary catalytic combustion chamber 38. As previously indicated, the amount of air supplied through line 42 preferably is approximately one-half of the total amount of air supplied for oxidation of the LHV gas. Oxidation of combustibles in the partially oxidized LHV gas delivered from heat exchanger 34 occurs in secondary combustion chamber 46. By limiting the total air flow into the primary and secondary catalytic combustion chambers to an amount slightly (e.g. 5 percent) less than the stoichiometric equivalent of an LHV gas heating value that would cause the maximum permissible temperature rise, excessive temperatures in the catalytic combustion chambers are avoided even though the composition of the LHV may vary widely.

Heat released in the secondary combustion chamber may increase the temperature of the gases to, for example, approximately 1600° F. at the outlet line 48 from the secondary combustion chamber. Usually, it will be desirable to cool the gases in line 48 to reduce the temperature of the gases to a temperature that provides a margin of safety below the maximum operating temperature of a gas turbine 52 into which the gas is delivered. Some turbines are capable of withstanding temperatures up to about 2000° F.; however, it is preferred to reduce the temperature of the gases to 1400° F. to 1600° F. by dilution with air before delivery into the turbine. The desired cooling may be accomplished by introducing cooling air from line 50 into line 48. The temperature at which the combustion products leave the secondary combustion chamber is far below the temperature required to ignite those partially burned gases of low heating value in the absence of a catalyst; consequently, there is no danger of further combustion with resultant development of excessive temperatures occurring on mixing air from line 50 with the hot gases in line 48 even though the hot gases usually include unburned combustibles. The air introduced through line 50 is, therefore, cooling air rather than combustion air.

Figure 3:
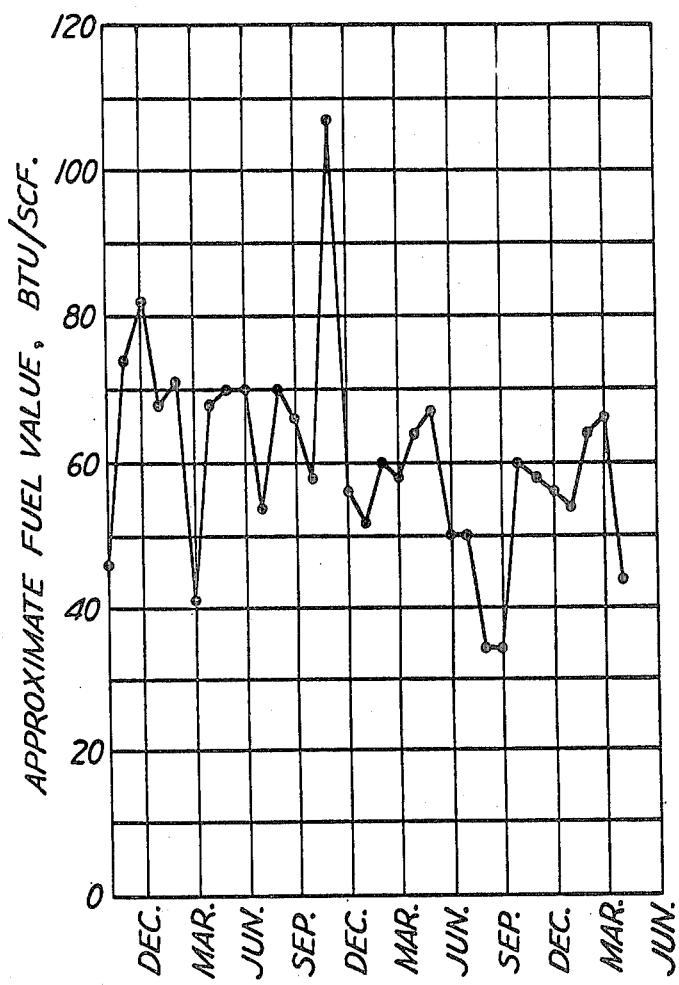
FIG. 3 is a chart showing the variation in the heating value of gases produced in an in-situ combustion process for the recovery of oil from an oil reservoir over a two and one-half year period.

Referring to FIG. 3 of the drawings, it will be noted that the heating value of the LHV gas produced during a typical in-situ combustion process varies substantially. Most of the time during the 2½ year operation shown in FIG. 3, the LHV gas produced by the in-situ process had a heating value above about 55 BTU/scf; however, the heating value was frequently in the range of 70 BTU/scf and on one occasion increased to over 100 BTU/scf. At other times, the heating value dropped below 50 BTU/scf. The wide swings in LHV gas composition introduce problems of controlling the temperature to prevent excessive temperatures that would damage the catalyst or the gas turbine and still operate the gas turbine under optimum conditions. To control the maximum temperature that may be attained and also maintain a uniform temperature, the catalytic combustion chambers are operated with less air than the stoichiometric equivalent of the combustibles in the LHV gas. In this manner, the amount of air supplied to the catalytic combustion chambers establishes the maximum temperature rise in the catalytic combustion chambers and, consequently, the maximum temperature that is attained. If the maximum permissible temperature in the catalytic combustion chamber is 1600° F., the amount of air mixed with the cold LHV gas entering the primary combustion chamber 38 will be such that when the oxygen in that air is completely consumed in burning combustibles in the LHV gas, the temperature in the combustion chamber will not exceed 1600° F. If oxidation catalysts having an acceptable life when used at higher temperatures to burn LHV gas should be used, and the heating value of the LHV gas should be high enough to raise the temperature of the combustion products above the maximum operating temperature of the catalyst, the amount of air delivered to the combustion chambers could be increased and thereby raise the maximum temperature that might be reached in the combustion chambers. The amount of air would be less than the stoichiometric equivalent of the LHV gas to maintain the desired temperature control.

Assuming that the LHV gas in line 32 to the preheater 34 is at a temperature of 100° F. and the maximum permissible catalyst temperature is 1600° F., the maximum total amount of air mixed with the LHV gas entering the primary combustion chamber 38 and with the hot combustion products from that combustion chamber delivered into the secondary combustion chamber can contain oxygen stoichiometrically equivalent to the combustibles in LHV gas having a heating value of approximately 50 BTU/scf. If the heating value of the LHV gas should be as in the field test referred to above, that amount of air would be less than stoichiometrically equivalent to the combustibles in the LHV gas during approximately 90 percent of the time. Preferably, approximately fifty percent of the total amount of combustion air is introduced into the system by mixing with the LHV gas before delivery into the primary combustion chamber and the remainder is mixed with the products of combustion from the primary combustion chamber before delivery to the secondary combustion chamber.

While controlling the rate of air admixture with the LHV gas introduced into the primary and into the secondary catalytic combustion chambers at a rate that is less than the stoichiometric equivalent of the normal LHV gas composition limits the maximum temperature rise in the combustion chambers and is effective in protecting the catalyst from temperature rises that might otherwise result from increases in the heating value of the LHV gas, precise control to maintain a constant mass flow rate and temperature of the gas delivered to the turbine is desirable for most efficient operation of the turbine. Flow controller 24 in line 22 from separator 18 maintains the desired rate of flow of LHV gas into the system. Since the rate of flow of air to the combustion chambers is constant, a drop in the temperature of gases discharged from the secondary catalytic combustion chamber indicates that the combustible materials in the LHV gas are less than the stoichiometric equivalent of the combustion air delivered into the system. The desired temperature can be obtained with little change in the mass flow rate by introducing an auxiliary fuel into the system. A temperature sensor 53 in line 48 adjacent the outlet end of secondary combustion chamber 46 can be connected to actuate a flow control valve 55 in an auxiliary fuel line 57. If the temperature in line 48 should drop, the temperature sensor 53 would actuate flow control valve 55 to enrich the mixture delivered to the secondary combustion chamber 46. To provide stable operation, the controls will inject sufficient auxiliary fuel to increase the heating value of the LHV gas delivered to the combustion chambers an amount such that the air is slightly less than the stoichiometric equivalent of the total combustibles in the LHV gas and auxiliary fuel. Alternatively, a hydrocarbon analyzer can be installed to withdraw a sample from line 22 and determine the hydrocarbon content, and, hence, the heating value, of the LHV gas. A signal generated by the hydrocarbon analyzer can be used to control valve 55. Clearly, the auxiliary fuel can be introduced into the system at any point upstream of the secondary catalytic combustion chamber, such as into line 22. Usually, the auxiliary fuel will be natural gas or LPG. The heating values of natural gas and LPG are high and the concentration of inerts in those fuels is low; consequently, a desired increase in the temperature of the combustion products can be obtained with a negligible change in the mass flow rate to the turbine.

The hot gases are expanded in the turbine to substantially atmospheric pressure, and the gases from the turbine are discharged to the atmosphere. If necessary, gases discharged from the turbine can be passed through a suitable scrubber to remove contaminants before being discharged into the atmosphere. The gases discharged from turbine 52 will be hot and could be passed through a heat exchanger to supply heat for process or other use, if desired.

Energy produced by turbine 52 is used to compress air used in the combustion of the LHV gas and in the in-situ combustion process. In the embodiment illustrated, the turbine is shown as directly connected to drive a low pressure compressor 54 which compresses air to a pressure exceeding the operating pressure of the catalytic combustion chamber 38 sufficiently for easy control of air flow into the system. That air is delivered into a header 56 to which lines 35, 42 and 50 are connected for delivery of air as needed for the combustion of the LHV gas and subsequent cooling of the combustion products from the secondary combustion chamber.

Turbine 52 also drives a high-pressure compressor 58 that compresses air for use in the in-situ combustion process. Air compressed in compressor 54 in excess of the air required for combustion of the LHV gas and cooling is bled from compressor 54 and delivered to compressor 58 through a line 59. Line 59 is provided with flow control means indicated by valve 61 to control the flow of bleed air to compressor 58. In a preferred arrangement, the turbine-type compressor 58 compresses air to an intermediate pressure of the order of 250–300 psig, and that air is delivered through line 60 to a centrifugal or reciprocating compressor 62 for further compression to a pressure typically in the range of 2,000 psig to 3,000 psig. The pressure to which the air is compressed by compressor 62 will depend upon the particular in-situ combustion process and will vary with several parameters of the in-situ combustion process such as the depth of the subsurface formation into which the air is to be injected, the viscosity of the oil, the permeability of the subsurface formation, the rate of injection of air into the formation, and the desired pressure at the production well. Air from compressor 62 is delivered through line 64 into injection well 14. In an alternative arrangement, air compressor 58 is constructed to allow withdrawal of air from an intermediate stage of the compressor at a low pressure for use in combustion of the LHV gas. With that arrangement, low pressure compressor 54 will not be necessary.

While supplying air at a rate that is less than the stoichiometric equivalent of the combustibles in the LHV gas causes some loss of the potential energy available in the combustibles in the LHV gas, the importance of such loss is minimized by the gain in the compressed air that is made available for use in the in-situ combustion process. If air were delivered to the catalytic combustion chambers at a rate equivalent to the stoichiometric equivalent of an LHV gas having a heating value of 70 BTU/scf, for example, and the maximum permissible temperature in the gas turbine remained at 1600° F., it would be necessary to cool the gas discharged from the secondary combustion chamber before delivery to the turbine. If air from compressor 54 should be used to dilute the combustion products and thereby cool them to the desired temperature for delivery to the gas turbine, such air would reduce the amount of air delivered from compressor 54 to compressor 58 for use in the in-situ combustion process.

It is an important advantage of this invention that the desired safeguards against temperature and flow rate variations and excessive temperatures can be obtained while complying with the usual antipollution regulations. Hydrogen sulfide and the higher molecular weight hydrocarbons are preferentially, as compared to methane, oxidized in the catalytic combustion chambers. The unoxidized combustible material discharged from the secondary combustion chamber because of the deficiency in air is almost entirely methane, a gas that usually is not subject to antipollution regulations.

As an example of the preferential oxidation of the hydrocarbons having a higher molecular weight than methane, a hydrocarbon gas-air mixture was passed in contact with a platinum catalyst deposited on a ceramic support at an inlet temperature of 840° F. and a maximum temperature of 1430° F. The hydrocarbons were mixed with about 50 percent of the stoichiometric air, thereby giving a mixture with a severe deficiency in air. The composition of the hydrocarbons, the outlet composition, and the percent conversion of each of the hydrocarbons are set forth below:

TABLE I

| Hydrocarbon Conversion | | | |
|---|---|---|---|
| | Inlet Composition | Outlet Composition | % Conversion |
| Methane | 1.09% | 0.97% | 11.00 |
| Ethane | 0.22% | 0.15% | 31.8 |
| Propane | 0.34% | 0.19% | 44.1 |
| i Butane | 0.06% | 0.03% | 50.0 |
| n Butane | 0.22% | 0.10% | 54.5 |
| i Pentane | 0.06% | 0% | 100.0 |
| n Pentane | 0.08% | 0% | 100.0 |

Similar tests were made with larger equivalence ratios (ratio of amount of air supplied to the amount of air stoichiometrically equivalent to the combustibles in the gas). The results are presented in Tables II and III:

TABLE II

| Hydrocarbon Conversion | | | |
|---|---|---|---|
| | Inlet Composition | Outlet Composition | % Conversion |
| Methane | 3.54% | 0.47% | 87% |
| Ethane | 0.39% | 0% | 100% |
| Propane | 0.32% | 0% | 100% |
| i-Butane | 0.11% | 0% | 100% |
| n-Butane | 0.24% | 0% | 100% |
| i-Pentane | 0.14% | 0% | 100% |
| n-Pentane | 0.16% | 0% | 100% |

Equivalence Ratio = 0.96

TABLE III

| Hydrocarbon Conversion | | | |
|---|---|---|---|
| | Inlet Composition | Outlet Composition | % Conversion |
| Methane | 3.62% | 2.23% | 38% |
| Ethane | 0.40% | 0.16% | 60% |
| Propane | 0.28% | 0.06% | 79% |
| i-Butane | 0.09% | 0% | 100% |
| n-Butane | 0.18% | 0% | 100% |
| i-Pentane | 0.08% | 0% | 100% |
| n-Pentane | 0.07% | 0% | 100% |

Equivalence Ratio = 0.60

It is apparent from the results shown in Tables I, II and III that even with a deficiency of air more severe than would normally be caused by a surge in combustibles in the LHV gas, preferential removal of the heaviest hydrocarbons from the LHV gas was accomplished in the catalytic combustion chamber. Combustion of methane lagged far behind the combustion of other hydrocarbons. As the equivalence ratio increased to the range normally used, the hydrocarbons other than methane are virtually completely consumed. This invention is, therefore, particularly advantageous when the fuel available varies in heating value and consists of a mixture of combustibles that includes methane as one of the combustible constituents.

An important advantage of the process of this invention in utilizing LHV gas from in-situ combustion processes from which the LHV gas is produced at pressures, preferably exceeding 75 psig, high enough to drive a gas turbine, is that the utilization of energy in the LHV gas is more efficient than in gas of higher heating value. If fuels of high heating value such as natural gas are used in gas turbines, the air to fuel ratio is high, such as 40 to 1 or higher, to dilute the combustion products and thereby avoid temperatures higher than the turbine blades can withstand. A substantial portion of the energy produced by the turbine is used to compress the diluent air for mixture with the hot gases before delivery into the turbine. In contrast, the LHV gas contains inert gases that will serve as a diluent to help avoid excessive temperatures in the turbine, and it is necessary to compress only very little dilution air in addition to air required for burning the combustibles in the LHV gas.

The temperature rise that occurs on burning a 50 BTU/scf LHV gas with stoichiometric air is approximately 1425° F. Because it is necessary that the temperature of the LHV-air mixture delivered to the catalyst be at least 400° F., and preferably in the range of 600° F. to 800° F., burning a 50 BTU/scf gas in a single stage would cause catalyst temperatures to exceed 1600° F. substantially. Therefore, a single-stage, self-supporting LHV catalytic combustion process in which the combustibles in a 50 BTU/scf LHV gas are consumed is possible only if the catalyst can withstand prolonged exposure to temperatures of 1825° F. and higher, and preferably higher than 2025° F. The term self-supporting is used to designate a process in which the hot combustion products from the catalytic combustion chamber heat the LHV gas to a temperature such that on mixing with the compressed air will form a mixture at 400° F. Single-stage catalytic combustion with a catalyst limited to a maximum temperature of 1600° F. is limited to burning combustibles to liberate about 33 BTU/scf of the LHV gas. Such an operation would suffer a disadvantage, as contrasted to the preferred two-stage operation, of lower turbine efficiency resulting from the lower temperature of the gases delivered to the turbine if the hot gases from the combustion chamber are used to heat the LHV gas to the temperature necessary to form a mixture of 400° F. or higher upon admixture with compressed air. In a single-stage operation utilizing a catalyst limited to a maximum temperature of 1600° F., the amount of air mixed with the LHV gas would be limited to the stoichiometric equivalent of approximately 33 BTU/scf LHV gas to protect the catalyst from excessive temperatures resulting from periodic increases in the heating value of the LHV gas composition such as occur in in-situ combustion processes. The concept of protection against variations in fuel composition by limiting the oxygen supplied to the combustion chamber can, therefore, be used in a single-stage operation. A two-stage catalytic combustion process is preferred for LHV gas having a heating value of 40–80 BTU/scf, however, to recover a larger part of the energy available in the LHV gas and to operate the turbine more efficiently.

If two-stage catalytic combustion of the type described with respect to FIG. 1 is used to burn gases consistently having heating values higher than about 80 BTU/scf, it will be necessary to discard a substantial amount of the heating value of the gas in the form of unburned hydrocarbons leaving the secondary combustion chamber.

If the normal heating value of the gas from the in-situ combustion process should be consistently above approximately 70 BTU/scf, for example ranging upwardly from 70 to 80 BTU/scf, and the maximum permissible catalyst and turbine temperatures are approximately 1600° F., it is desirable to use a third catalytic combustion chamber to reduce the loss of energy in the unburned hydrocarbons. It will then be necessary to cool the gases discharged from the secondary catalytic combustion chamber before delivering the gases to the third combustion chamber. Such cooling can be obtained by passing gases discharged from the second combustion chamber through a boiler in heat exchange with water to generate steam. The effluent from the boiler is then mixed with tertiary combustion air and delivered to the third catalytic combustion chamber. Steam generated in the boiler can be used as process steam or to drive a turbine. A preferred method for recovering additional energy from LHV gas having a heating value normally exceeding about 70 BTU is to position a tertiary catalytic combustion chamber 66 downstream of the gas turbine 52 as illustrated in the drawing. The gases discharged from the turbine are delivered to the third stage combustion chamber at a temperature in the range of 400° to 800° F. Air is delivered to the tertiary combustion chamber 66 through a line 67 from the compressor 54 and the mixture passed in contact with an oxidation catalyst in the combustion chamber to oxidize hydrocarbons remaining in the gas discharged from the turbine. Valves in lines 67 and 59 allow control of the amount of air delivered to each of tertiary catalytic combustion chamber 66 and compressor 58. The hot gases from tertiary combustion chamber 66 are delivered to a boiler 68 for the generation of steam. In the event three combustion chambers are used, the delivery of air to the first two combustion stages is controlled to operate the turbine at optimum conditions. The third combustion stage could operate at stoichiometric conditions or with an excess of air if the heating value of the gas is such that excessive catalyst temperatures are not developed in the third stage. The gas turbine 52 operates with less than stoichiometric air at all times.

Figure 2:
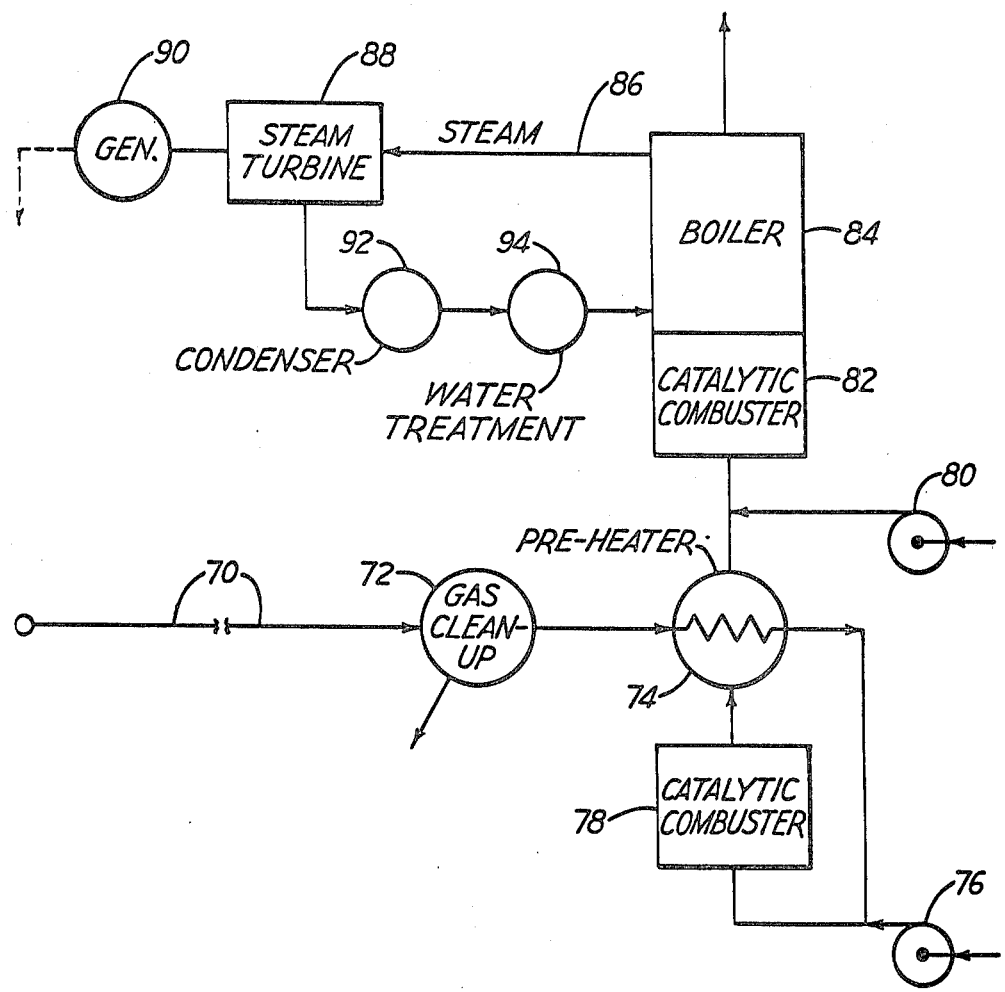
FIG. 2 of the drawings is a diagrammatic flow sheet of an embodiment of this invention in which the combustion products generate steam that is used to drive a turbine.

The embodiment of the invention illustrated in FIG. 2 is for use in those situations where the LHV gas discharged from the in-situ process is not at a high enough pressure for efficient use in driving a gas turbine. The low pressure LHV gas may, for example, be produced in an in-situ combustion process for recovery of oil from a shallow underground reservoir at a low pressure or in the in-situ combustion of oil shale. The LHV gas is delivered through a pipe line 70 to a suitable gas cleanup unit 72 for removal of solid particles or other components that may interfere with the subsequent catalytic oxidation of the gas. The gas cleanup unit 72 may be in the form of a suitable separator or screening or washing apparatus. LHV gas from the gas cleanup unit 72 is delivered to a preheater 74 similar to preheater 34 in the embodiment illustrated in FIG. 1, for preheating to a temperature of 400° F. to 800° F. Preheated LHV gas discharged from the preheater 74 is mixed with combustion air supplied by a suitable blower or compressor 76 and delivered into a primary catalytic combustion chamber at a temperature of 400° F. to 800° F. Catalytic combustion chamber 78 is preferably similar to catalytic combustion chamber 38 illustrated in FIG. 1.

The hot combustion products from the primary catalytic combustion chamber 78 are delivered into preheater 74 for indirect heat transfer with the LHV gas. The combustion products from preheater 74 are mixed with additional combustion air from blower 80, which results in a temperature in the range of 400° F. to 800° F., and delivered into a secondary catalytic combustion chamber 82. As in the embodiment illustrated in FIG. 1, air for oxidation in the secondary chamber also can be mixed with the partially burned gases from the primary combustion chamber before those gases are delivered to preheater 74.

Instead of delivering the combustion products from secondary catalytic combustion chamber 82 to a gas turbine, as in the embodiment illustrated in FIG. 1, the combustion products are delivered to a boiler 84 for generating steam. Because the combustion products from the secondary catalytic combustion chamber 82 are not delivered to a turbine, they are not cooled before delivery to the boiler 84. The high temperature of the combustion products discharged from the secondary catalytic combustion chamber allows generation of steam at a high pressure suitable for driving a prime mover such as a steam turbine. Steam from the boiler 84 is delivered through line 86 to a steam turbine 88 which is preferably connected to a generator 90 to generate electricity to drive air compressors for the in-situ combustion process. The steam turbine may, alternatively, be directly connected to compressors. Steam discharged from turbine 88 is delivered to a condenser 92 and the condensed steam passed through suitable water treatment 94 which includes a pump for returning the condensed water to boiler 84. As an alternative to the generation of steam as illustrated in FIG. 2, low pressure off-gases from in-situ combustion of oil shale, for example, could be used in the system of FIG. 1 modified to utilize a portion of the energy generated by turbine 52 to compress the LHV gas to a pressure high enough to drive the turbine.

The temperatures to which the LHV gas is preheated and combustion products from the primary catalytic combustion chamber are cooled in preheater 74 are designed to avoid excessively high temperatures which could damage the catalyst in combustion chambers 78 and 82. As in the embodiment illustrated in FIG. 1, control of the maximum temperatures is obtained by control of the amount of air mixed with the LHV gas before delivery into the catalytic combustion chambers to prevent overheating of the catalytic combustion chambers even though there should be a substantial increase in the concentration of combustibles in the LHV gas delivered through pipe 70. The amount of air supplied by blower 76 is preferably approximately one-half the stoichiometric equivalent of the quantity of combustibles that will give the maximum permissible temperature use, and an equal amount of air is supplied by blower 80 for the oxidation in the secondary combustion chamber 82.

The method and apparatus herein described are highly advantageous for the recovery of power from LHV gas from in-situ combustion processes for the recovery of oil because of the variations from time to time in the heating value of the gas. While the method is most useful for the recovery of power from the gas produced at elevated pressures in in-situ combustion processes for the recovery of oil from oil or tar sand reservoirs, it is also useful in recovery of power from low-pressure off-gases from the in-situ combustion of oil shale in those instances when such off-gases cannot be burned in a flame combustor because of its low heating value. The limitation of the amount of air mixed with the LHV gas to the stoichiometric equivalent of the normal LHV gas provides protection for both the catalyst and the turbine against wide variations that occur in the composition of the LHV gas. This invention is particularly valuable when methane is one of the combustible constituents of the LHV gas.

The parent application, U.S. Ser. No. 925,703, referred to above claims the method herein described generically and claims specifically the method of recovery of energy from LHV gases in which the LHV gas is mixed with air and the resulting mixture passed through the preheater before delivery to the combustion chambers. U.S. application Ser. No. 930,557 claims the apparatus described herein generically and claims specifically apparatus in which the LHV gas delivered to each combustion stage is mixed with air before delivery to the preheater for producing a mixture at the desired temperature for delivery to the combustion chambers.

We claim:

1. A method for the production of power from LHV gases from an in-situ combustion process for the recovery of oil from a subsurface deposit comprising:
    (a) preheating the LHV gas to a temperature such that on mixing with air as set forth in step (b) the mixture will have a temperature of 400° F. to 800° F.;
    (b) mixing the preheated LHV gas from step (a) with air in an amount such that the air is less than the stoichiometric equivalent of the combustibles in the LHV gas and insufficient to result in a rise in temperature in step (c) that will damage the oxidation catalyst;
    (c) passing the mixture of air and LHV gas in contact with an oxidation catalyst to oxidize combustibles in the LHV gas and thereby produce hot combustion products; and
    (d) generating power from the hot combustion products.

2. A method as set forth in claim 1 characterized by the generation of power in step (d) being accomplished by expanding the hot combustion products in a gas turbine.

3. A method as set forth in claim 1 characterized by the in-situ combustion process being conducted in a petroleum reservoir for the production of petroleum.

4. A method as set forth in claim 1 characterized by the in-situ combustion process being conducted in a rubblized retort of oil shale in an oil shale deposit for the production of shale oil.

5. A method as set forth in claim 1 characterized by the generation of power in step (d) being accomplished by passing the hot combustion products through a boiler for the generation of steam, and driving a prime mover with the steam.

6. A method as set forth in claim 1 characterized by the preheating of the LHV gases in step (a) being accomplished by indirect heat exchange with hot combustion products from step (c).

7. A method for the production of power from LHV gases from an in-situ combustion process for the recovery of oil from a subsurface deposit comprising:
    (a) preheating the LHV gas to a temperature such that on mixing with primary combustion air as set forth in step (b) the mixture will have a temperature in the range of 400° to 800° F.;
    (b) mixing the preheated LHV gas from step (a) with primary combustion air in an amount such that the primary combustion air is less than the stoichiometric equivalent of the combustibles in the LHV gas and limits the increase in temperature on combustion in step (c) to avoid damage to the oxidation catalyst;
    (c) passing the mixture of air and LHV gas in step (b) in contact with an oxidation catalyst in a primary combustion chamber to oxidize combustibles in the LHV gas and thereby produce partially oxidized LHV gas;
    (d) cooling the partially oxidized gas from the primary combustion chamber to a temperature such that on mixing with secondary combustion air as set forth in step (e) the mixture will have a temperature in the range of 400° to 800° F.;
    (e) mixing the cooled partially oxidized gas from step (d) with secondary combustion air in an amount such that the secondary combustion air is less than the stoichiometric equivalent of the remaining combustibles in the effluent;
    (f) passing the mixture from step (e) in contact with an oxidation catalyst in a secondary combustion chamber to oxidize combustibles therein and thereby produce hot combustion products; and
    (g) generating power from the hot combustion products.

8. A method as set forth in claim 7 characterized by the generation of power in step (g) being by expanding the hot combustion products in a gas turbine.

9. A method as set forth in claim 7 characterized by the generation of power being by passing the hot combustion products through a boiler to generate steam, and driving a prime mover with the steam.

10. A method as set forth in claim 7 characterized by the preheating of the LHV gas in step (a) and the cooling in step (d) being accomplished by passing the LHV gas in indirect heat transfer with the effluent from the primary oxidation chamber.

11. A method as set forth in claim 10 characterized by the generation of power being accomplished by expanding the hot combustion products from the secondary combustion chamber in a gas turbine.

12. A method as set forth in claim 10 characterized by the generation of power being accomplished by passing the hot combustion products from the secondary combustion chamber through a boiler to generate steam.

13. A method as set forth in claim 11 characterized by:
(g) mixing gases discharged from the gas turbine with tertiary combustion air;
(h) passing the mixture from step (g) in contact with an oxidation catalyst in a tertiary combustion chamber to oxidize combustibles in the gas; and
(i) passing gases from step (h) through a boiler for generation of steam.

* * * * *